Patented June 24, 1930

1,767,083

UNITED STATES PATENT OFFICE

OTTO LEOPOLD, OF CINCINNATI, OHIO

FOOD PRODUCT AND PROCESS FOR MAKING SAME

No Drawing.   Application filed February 12, 1927.   Serial No. 167,869.

At the present time large quantities of so-called plain buttermilk are thrown away in creameries. This substance could be utilized for feeding hogs and the like except that the cost incident to transportation generally is greater than the value of the substance. The product, for similar reasons, can not be profitably used or processed if it would be necessary to transport it.

An object of this invention is to produce a food product from said product by means commonly and generally used at creameries and dairies.

Although the product about to be described and the process employed therewith are not restricted to buttermilk, the invention about to be described will be explained in conjunction with so-called plain buttermilk which constitutes the residue after a quantity of buttermilk has been churned. In some dairies it is common practice to pasteurize and otherwise treat milk and cream used for churning butter, wherefore the resultant product known as plain buttermilk is neither of attractive appearance nor palatable immediately after the butter churning process has been completed. Generally, this so-called plain buttermilk is of substantially the following composition:

|  | Per cent by weight |
|---|---|
| Butterfat | 0.65 |
| Casein | 2.50 |
| Albumin | 0.80 |
| Milk sugar | 4.50 |
| Lactic acid | 0.35 |
| Ash (mineral salts) | 0.80 |
| Water | 90.40 |
|  | 100.00 |

In carrying out my process for producing the herein explained product the following proportions and temperatures will give satisfactory results, although it is to be understood that they are subject to reasonable variations. 3 pints of ordinary or plain buttermilk are used for obtaining 1 to 2 pints of finished product. A portion of 3 pints of buttermilk has added to it about ½ pound to 11 ounces of cane sugar or granulated sugar. All of the sugar is dissolved in a small quantity of buttermilk, heat being utilized to assist in accomplishing dissolution. During this period the sugar and buttermilk turn brown. After the sugar has all been dissolved or rendered liquid the remainder of the 3 pints of buttermilk is added to the dissolved sugar and buttermilk and this substance is then cooked or boiled. The cooking or boiling is primarily for the purpose of evaporation of the water content, wherefore evaporation at about 212 degrees F. for about 1¼ hours to 1½ hours produces the finished product. This finished product, after cooling, may be utilized as a spread for bread, pan cakes, waffles, et cetera, and may be used as a filling for pies and the like. It is readily utilized as a substitute for maple syrup, it keeps indefinitely and apparently is unaffected by variations in temperature and exposure to atmosphere. Approximately, the finished product is of the following composition:

|  | Per cent |
|---|---|
| Water | 45.48 |
| Cane sugar | 37.60 |
| Milk solids |  |
|   Butterfat | 1.15 |
|   Casein | 4.41 |
|   Albumin | 1.41 |
|   Milk sugar | 7.93 |
|   Lactic acid | .62 |
|   Ash | 1.40 |
|  | 16.92 |
|  | 100.00 |

The process described has been used with satisfactory results upon commercial lactic buttermilk and whole milk lactic buttermilk, as well as from whole milk. Commercial lactic buttermilk is made from skim milk and is not produced from the butter churning process as is plain or ordinary buttermilk. Whole milk lactic buttermilk is not obtained from the butter churning process but is obtained by heating the whole milk and thereafter adding lactic bacilli thereto.

One of the batches of whole milk lactic buttermilk before processing had the following composition:

|  | Per cent by weight |
|---|---|
| Butterfat | 3.50 |
| Casein | 2.50 |
| Albumin | 0.80 |
| Milk sugar | 4.50 |
| Lactic acid | 0.75 |
| Ash (mineral ash) | 0.80 |
| Water | 87.15 |
|  | 100.00 |

The use of various buttermilks as noted, produces variations in the composition of the finished product, for example, a batch of finished product made from commercial lactic buttermilk showed the following composition:

|  | Per cent |  |
|---|---|---|
| Water |  | 39.74 |
| Cane sugar |  | 37.60 |
| Milk solids |  |  |
| Butterfat | 6.18 |  |
| Casein | 4.41 |  |
| Albumin | 1.41 |  |
| Milk sugar | 7.93 |  |
| Lactic acid | 1.33 |  |
| Ash | 1.40 |  |
|  |  | 22.66 |
|  |  | 100.00 |

It has been determined that variations in butterfat from 0 to 4% and variations in lactic acid from 0 to 1% will have no effect on the specific gravity or weight per gallon. The milk solids are therefore easily corrected for small variations of the lactic acid and butterfat content.

The percent butterfat in the final product is approximately:

$$\frac{\text{Initial percent butterfat times } 3.226}{1.8794}$$

or initial percent butterfat times 1.764.

The percent lactic acid in the final product is: Initial percent lactic acid times 1.764.

The increase or decrease of milk solids should be subtracted from or added to percent of water as the percent of cane sugar remains constant at 37.60 percent.

The process has been employed with whole milk and cream with substantially similar results.

The weights of the plain buttermilk, sugar, et cetera, referred to previously, and the resultant product were as follows:

Start with
| 11 ounces sugar | 0.69 pounds. |
| 3 pints buttermilk | 3.23 pounds. |
| Total | 3.92 pounds. |
| Boil off water | 2.08 pounds. |

1.84 pounds per pint.

Finish with
| Weight of product per gallon | 14.63 pounds. |
| Specific gravity with regards to water | 1.75 |

The weights and specific gravity, for practical purposes, were identical with the foregoing when using the previously mentioned commercial lactic buttermilk.

What is claimed is:

1. A process for preparing a food product comprising the steps of heating a mixture of sugar and buttermilk for dissolving the sugar in the buttermilk for attaining a concentrated brown syrup-like substance, adding to the said syrup a quantity of buttermilk and evaporating the admixture of syrup and buttermilk for producing a jelly-like brown syrup-like mass.

2. A process for preparing a food product comprising the steps of admixing a small quantity of buttermilk with ½ pound of cane sugar and applying heat thereto for dissolving the sugar and producing a brown syrup-like mass, adding to that mass a sufficient quantity of buttermilk to approximate a total of 3 pints of buttermilk in the admixed substance and boiling off the water at approximately 212 degrees F at approximately atmospheric pressure for approximately 1½ hours.

3. As a new composition of matter a food product comprising approximately 45.48 per cent water, 37.60 per cent sugar, and a residue of milk solids of approximately the following proportions:

|  | Per cent |
|---|---|
| Water | 45.48 |
| Cane sugar | 37.60 |
| Milk solids |  |
| Butterfat | 1.15 |
| Casein | 4.41 |
| Albumin | 1.41 |
| Milk sugar | 7.93 |
| Lactic acid | .62 |
| Ash | 1.40 |
|  | 16.92 |
|  | 100.00 |

4. A food product comprising an evaporated mass of buttermilk and cane sugar of substantially the following proportions:

|  | Per cent |
|---|---|
| Water | 45.48 |
| Cane sugar | 37.60 |
| Milk solids |  |
|     Butterfat | 1.15 |
|     Casein | 4.41 |
|     Albumin | 1.41 |
|     Milk sugar | 7.93 |
|     Lactic acid | .62 |
|     Ash | 1.40 |
|  | 16.92 |
|  | 100.00 |

5. A process for preparing a food product in the nature of a spread for bread, waffles and the like comprising the steps of admixing a relatively small quantity of buttermilk and sugar, for dissolving the sugar with heat to form a syrup, then applying heat thereto, adding a relatively large quantity of buttermilk to the mixture thus prepared, and finally boiling the resultant mixture for approximately 1½ hours.

In testimony whereof, I have hereunto subscribed my name this 25th day of January, 1927.

OTTO LEOPOLD.